UNITED STATES PATENT OFFICE.

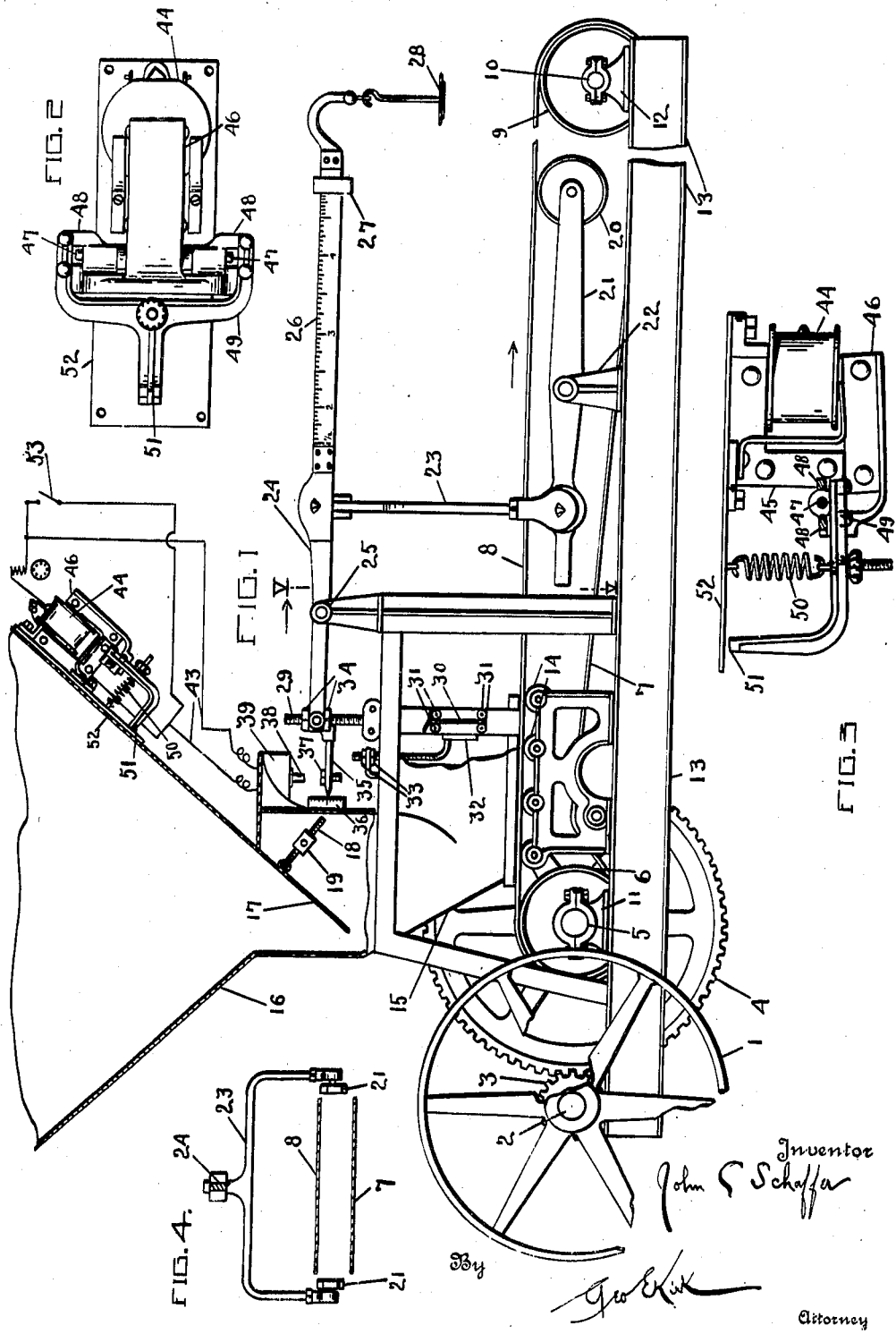

JOHN C. SCHAFFER, OF TIFFIN, OHIO.

MATERIAL-FLOW-CONTROLLING MECHANISM.

1,324,930.	Specification of Letters Patent.	Patented Dec. 16, 1919.

Application filed April 1, 1916. Serial No. 88,405.

*To all whom it may concern:*

Be it known that I, JOHN C. SCHAFFER, a citizen of the United States of America, residing at Tiffin, Seneca county, Ohio, have invented new and useful Material-Flow-Controlling Mechanisms, of which the following is a specification.

This invention relates to determined feed rate devices.

This invention has utility when incorporated as a continuous weighing mechanism with control connections.

Referring to the drawings:

Figure 1 is a side elevation with parts broken away of an embodiment of the invention for handling loose fragments or bulk material as grains, minerals, etc., being especially adapted for handling determined quantities of coal, sand, lime, etc.;

Fig. 2 is a plan view of the vibrator;

Fig. 3 is a side elevation of the vibrator;

Fig. 4 is a section on the line V—V, Fig. 1 looking in the direction of the arrow.

The driving pulley 1 mounted on the shaft 2 has fixed therewith the pinion 3 meshing with the gear 4 fixed on the shaft 5 driven to draw over the pulley 6 thereon, the under-reach 7 of the belt or conveyer having the upper reach 8, the remote portion of said belt passing over the pulley 9 on the shaft 10. These shafts 5 and 10 are mounted in brackets or bearings 11, 12 respectively, carried by the frame 13. Adjacent the pulley 6 along the under side of the upper reach of the belt conveyer are disposed sustaining rollers 14 beneath the chute 15 from the hopper 16. In the throat of the hopper 16 is disposed the pivoted vane 17 having the arm 18 along which the weight 19 may be adjusted to vary the action. This vane tends to regulate the uniformity of the material supply from the hopper 16 to the discharge chute 15 and avoids shaking down of sudden large quantities which might tend to affect the nicety of the operation of the continuous weighing device.

Coacting with the under side of the slack reach 8 of the conveyer belt or way is the way support or idler roller 20 mounted on the lever 21 carried by the bracket 22 mounted on the frame 13. The lever 21 is so designed that its end remote from the way support 20, is balanced with the way support, or if not heavy enough is balanced by loading the pan 28. Weight 27 may be set at pounds on the scale for load weight lineal foot for which the device is to be used. Controlling this loading and bringing the idler 20 into proper position is the link 23 pivotally connected to the scale beam 24 fulcrumed in the bracket 25. The short arms between the link 23 and the brackets 22, 25, render the action of the scale beam 24 accurate. On this scale beam 24 are the graduations 26 and the action due to loading of the conveyer 8 is adjusted by the movable weight 27 while the pan 28 may carry additional weights if desired, thereby adjusting the device to different flow rates of material on the conveyer 8. This flow rate adjustment is effected by the beam 24 coacting with the rod 29 connected to the reciprocating gate 30 movable between the anti-friction roller guides or bearings 31 to vary the clearance of this gate 30 as to the conveyer 8 for delivery of material from the chute 15.

To prevent material in the chute 15 from crowding against the gate 30, the shield plate 32 may be adjusted by the nuts 33 to a position protecting the gate 30. The position of the shield 32 should be such that when the beam 24 is in horizontal position the gate 30, as adjusted by the nuts 34, may still have freedom to control the feeding flow of material. The position of the beam 24 for balancing may be accurately indicated by the pointer 35 movable along the fixed scale 36. This pointer 35 carries the adjustable bolt 37 movable in the extreme or unloaded carrying position of the device to act upon the plunger 38 movable thereby into the housing 39 of the conventional push button switch to close the circuit 43 to permit flow of an alternating electric current for energizing the coil 44 having the core 45. This energizing action causes the core to attract the armature 46 pivotally mounted on the pin 47 through the ledges 48 of the armature 46 contacting with the arm 49 also pivoted on the pin 47, the arm 49 is rocked against the resistance of the adjustable spring 50 (also tending to hold the armature 44 away from the core 45) to cause the free end 51 to vibrate the base plate 52 mounted on the side of the hopper 16. This pounding action may be an audible signal to the attendant that the material supply is not up to the determined rate while this vibrator also is effective in its action against the hopper 16 to shake loose any packed or clogging material thereby getting an automatic quick flow response to bring the material flow rate up to the continuous weighing determining point. This feeding or supplying of material in the embodiment herein disclosed may be adjusted accurately over a range varying from a few ounces up to many pounds per lineal foot and as so adjusted is reliable during the continued operation of the mechanism.

There is no occasion to await automatic action each time in shaking down stock in the hopper 16 for an attendant at a desired remote point or at the machine may operate the switch 53 for closing the alternating current circuit in the same manner that the switch 38 automatically closes the circuit and the vibrator will be effective as long as such circuit is closed to have the armature 46 rocked in hitting the core 45 while the adjustment of the spring 50 may be such that the free end 51 of the arm may hit the plate 52.

What is claimed and it is desired to secure by Letters Patent is:

1. A continuous weighing device embodying a conveyer belt, a driving pulley for the belt, a follower pulley about which the belt extends from the driving pulley providing therebetween a driving reach and a slack reach for the belt, and a compound lever mechanism coacting with the belt including an overbalanced lever, a roller mounted on one arm of the lever and normally thrust upwardly to sustain a portion of the slack reach of the belt, an upwardly extending link from the other arm of said lever, and a second lever to which said link extends, said second lever having a fulcrum and an adjustable scale beam between which fulcrum and scale beam the link is connected.

2. A conveyer belt, driving means therefor providing an upper slack reach for the belt, and a compound lever mechanism coacting with the belt including a first class lever provided with a roller coacting with the under side of said slack reach of the belt, a fulcrum for the lever, a link, a scale beam to which the link extends from the lever upward from the opposite side of the fulcrum from the roller, said scale beam having a fulcrum, and means connected to the beam for adjusting material supply to the belt, said supply adjusting means being connected to the beam on the opposite side of the scale beam fulcrum from the link, the scale arm of said beam being beyond the link on the same side of the fulcrum as the link, whereby the load on the belt and arm may coact to balance the lever.

3. A way, a self adjusting measuring device provided with means coacting to maintain uniform load upon said way, a hopper for supplying material to said way, said hopper being provided with a wall, a vibrator for the hopper mounted on the hopper wall for shaking said wall, and connecting means from the device for controlling the vibrator.

4. In a material handling device, a material flow chamber having a wall, means for withdrawing material from the chamber, a self adjusting measuring device sensitive to the rate of withdrawal of material by the means, a vibrator mounted on the chamber wall for shaking such wall, and connections from the device for actuating the vibrator when the material withdrawal rate is reduced.

5. A hopper, means mounted on the outside wall of the hopper for vibrating said wall including a rockable arm, a yielding means resisting the rocking of the arm, power means overcoming the action of the yielding means for effecting rocking of the arm, a traveling way for withdrawing material from the hopper, a weighing device for maintaining constant the withdrawal of material from the hopper by the way, and connections from the device for controlling the power means for actuating the rocking arm when the rate of withdrawal of material is reduced.

6. A hopper, means mounted on the outside wall of the hopper for vibrating said wall including a movable arm, yielding means resisting the movement of the arm and normally holding the arm firmly against the hopper wall, and electromagnetic means coacting with the arm intermittently to overcome the action of the yielding means, thereby effecting impacting of the wall by the arm.

In witness whereof I affix my signature.

JOHN C. SCHAFFER.